July 10, 1934.    R. T. HOWES    1,966,010
PROCESS OF REFINING OIL
Filed June 6, 1931
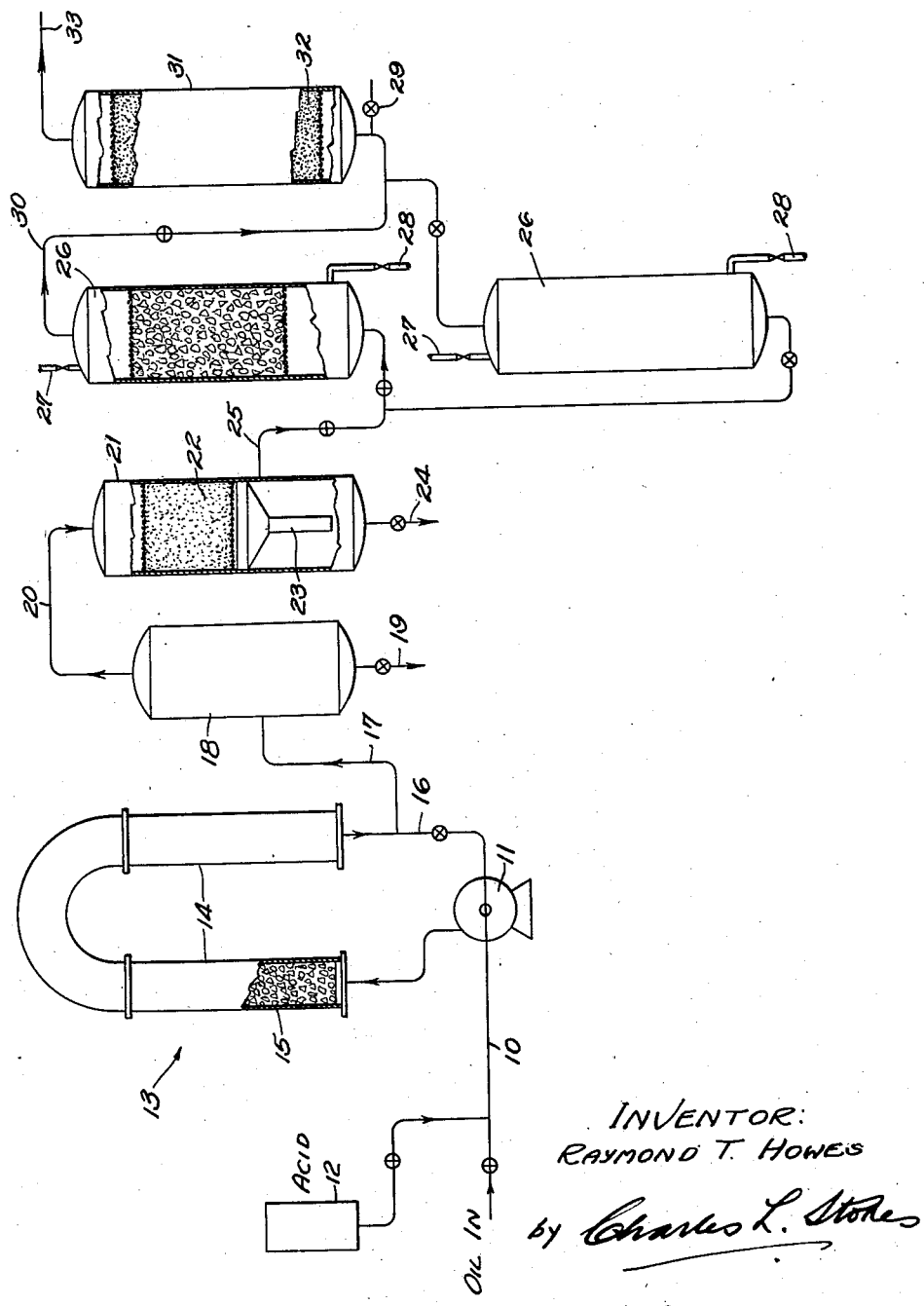
INVENTOR:
RAYMOND T. HOWES
by Charles L. Stokes
ATTORNEY.

Patented July 10, 1934

1,966,010

UNITED STATES PATENT OFFICE 1,966,010

PROCESS OF REFINING OIL

Raymond Thayer Howes, Long Beach, Calif., assignor, by mesne assignments, to Brucite Processes, Inc., a corporation of California Application June 6, 1931, Serial No. 542,591

6 Claims. (Cl. 196—40)

This invention relates to the treatment of oils, such as gasoline, cracked distillate, kerosene, and the like, and has for its particular object the efficient contacting of oils with a treating agent, such as sulphuric acid, the separation of the acid sludge substantially completely from the oil after such contacting, the complete neutralization of the oil, and the final drying, decolorizing, and filtering of the oil to yield a highly finished product.

Referring to the diagrammatic flow sheet, a stream of oil to be treated, such as kerosene, is passed through a pipe 10 to a pump 11 and has mixed therewith a suitable amount of a treating agent from the tank 12, such as concentrated sulphuric acid, or other acids, for a particular treatment, such as hydrochloric acid, or nitric acid.

Pump 11 forces the mixture of oil and acid through a contactor 13, which consists of a suitable length of conduit 14 of sufficient diameter and filled with a contact material 15, preferably composed of lumps of opaline silica about one inch in diameter; although it is to be understood that other suitable contact material may be employed.

The mixture is forced through conduit 14 and the contact material therein at a velocity sufficiently high to give great turbulence combined with relatively great contact area to the end that a minimum quantity of acid per unit of oil is required for successful treatment, it appearing that the lumps of contact material become covered with a film of acid and reaction products, which film continually aggregates until a surplus is swept off in drops to be further contacted with further contact material.

A portion of the oil and acid sludge is by-passed through pipe 16 to the suction side of pump 11 to be forced through contactor 13 with fresh mixture at a preferred rate of seven times the volume of the fresh mixture supplied, an amount of the treated mixture equivalent to said supply of fresh mixture being continuously drawn off by pipe 17 and passed into a sludge separator 18 of relatively large diameter wherein the large acid sludge particles are permitted to settle out by gravity and be withdrawn through pipe 19.

The oil still containing some fine particles of acid sludge passes through pipe 20 to a separator 21 containing a bed of opaline silica 22 in its upper portion, said silica being of finer mesh, which functions to retain all the fine particles of acid sludge until a coagulation of large drops occurs of such size that said drops will pass with the oil through a funnel 23 into the lower portion of separator 21 to settle out by gravity and be drawn therefrom through a pipe 24.

The oil, now completely freed from acid sludge particles, passes through pipe 25 into a neutralizing column 26 which is partially filled with lumps of magnesium oxide (MgO), or magnesium hydroxide (Mg(OH)$_2$) commonly known as brucite. This material is first wet with a stream of water passed in through pipe 27 and out through pipe 28 whereby a solution of magnesium hydroxide is formed to have the oil contact therewith and have its contained acids neutralized, all as shown in the copending application of Lyle Caldwell, Serial No. 447,275, filed April 25, 1930.

The continued passage of oil through the magnesium hydroxide finally exhausts the solution by reaction with the acids with the formation of magnesium sulphate which is a water soluble salt and when the concentration of the magnesium sulphate is sufficient (even up to the point of crystallization) the flow of oil is discontinued (by by-passing to a second similar column) and further water is passed through the column 26 to free the same of magnesium sulphate and form a fresh magnesium solution, whereupon the flow of oil is resumed upon exhaustion of the second similar column.

It is understood, of course, that the plurality of columns 26 is provided to assure the continuous flow of oil under treatment by deflecting the flow from one column to another upon exhaustion of the material therein, a valve 29 in the discharge line 30 being provided to test the oil for this purpose.

The neutralized oil flows through pipe 30 through a column 31 partially filled with fairly small particles of opaline silica 32 (about 20 mesh) which serve to dry and decolorize the oil by filtering therethrough, this material (which is a hydrated silica) replacing clay for this purpose; the finished oil being withdrawn through pipe 33.

The various steps of the process may be summarized as follows:

(1) The efficient contact with the oil of a minimum quantity of acid during a contact period under high velocity and turbulence.

(2) The separation of the coarse acid sludge particles.

(3) The separation by coagulation of the fine acid sludge particles in using opaline silica.

(4) The efficient neutralization of any residual acidity in the oil, such as organic acids, H$_2$S or the like, by the use of a magnesium hydroxide solution.

110

(5) The drying and decolorizing of the oil by filtration through a bed of opaline silica.

In practice, while the preferred velocity of the mixture recirculated through contactor 13 works out at a speed of 3½ feet per second which is the equivalent of passing a volume therethrough equal to seven times the input or takeoff, at the same time such speed should not be less than one foot per second for the best effects.

The use of a magnesium hydroxide solution in column 26 is desirable as set forth in said copending application, but other neutralizing agents may be used, such as sodium hydroxide solution, etc.

However, the specific use of opaline silica in column 21 as a coagulator for fine acid sludge particles is much superior to any known physical separator. Opaline silica is of the general formula $SiO_2 \cdot nH_2O$ and it has been found, for instance, that a two inch layer of such silica in a particlar sized column is more effective in removing "pepper" sludge than a twenty-two (22) inch layer of ordinary silica, a crystalline silica, having the formula $SiO_2$. Moreover, opaline silica may be used effectively when wet with water and appears to have a coagulating effect on acid sludge which approaches a chemical neutralization in its completeness of removal.

Likewise in decolorizing and drying, a considerable improvement in color with removal of moisture is noted by the treatment of the neutralized oil in column 31.

It is, of course, obvious that a plurality of circulatory contactors, such as 13, may be used as desired in order to give the required time period for efficient contacting.

I claim as my invention:

1. A process of treating oil which comprises: mixing sulphuric acid with a hydrocarbon oil for a predetermined time period, separating coarse sludge from the mixture, separating fine sludge from the mixture by passing the same through a bed of opaline silica without clogging said bed, removing the fine sludge from said bed by gravity, and then neutralizing the oil.

2. A process of treating oil which comprises: mixing sulphuric acid with a hydrocarbon oil for a predetermined time period by passage through a mass of contact material, separating coarse sludge from the mixture, separating fine sludge from the mixture by passing the same through a bed of opaline silica without clogging said bed, removing the fine sludge from said bed by gravity, and then neutralizing the oil.

3. A process of treating oil which comprises: mixing sulphuric acid with a hydrocarbon oil for a predetermined time period by passage through a mass of opaline silica, separating coarse sludge from the mixture, separating fine sludge from the mixture by passing the same through a bed of opaline silica without clogging said bed, removing the fine sludge from said bed by gravity, and then neutralizing the oil.

4. A process of treating oil which comprises: continuously supplying hydrocarbon oil and mineral acid to a circular contact zone containing opaline silica, continuously withdrawing from the said zone a volume of oil and acid equal to the supply of oil and acid, continuously circulating through the said zone a volume of oil and acid from 7 to 24 times the volume of said supply, and separating the oil from the acid after said withdrawal by passage through a mass by opaline silica.

5. In a process of acid treating oils that step which comprises: separating acid sludge particles from a hydrocarbon oil after treatment with mineral and by passing the oil through a bed of opaline silica wherefrom said particles separate by gravity.

6. In a process of acid treating oils that step which comprises: passing a neutralized mineral acid treated hydrocarbon oil through a bed of opaline silica.

RAYMOND THAYER HOWES.